(12) United States Patent
Lim et al.

(10) Patent No.: US 10,231,302 B2
(45) Date of Patent: Mar. 12, 2019

(54) POWER FACTOR CORRECTION CONTROL CIRCUIT AND DRIVING METHOD THEREOF

(71) Applicant: Magnachip Semiconductor, Ltd., Cheongju-si (KR)

(72) Inventors: Gyu Ho Lim, Cheongju-si (KR); Tae Kyoung Kang, Cheongju-si (KR); Zhi Yuan Cui, Cheongju-si (KR)

(73) Assignee: MAGNACHIP SEMICONDUCTOR, LTD. (KR)

( * ) Notice: Subject to any disclaimer, the term of this patent is extended or adjusted under 35 U.S.C. 154(b) by 50 days.

(21) Appl. No.: 14/819,616

(22) Filed: Aug. 6, 2015

(65) Prior Publication Data
US 2016/0081154 A1    Mar. 17, 2016

(30) Foreign Application Priority Data

Sep. 15, 2014   (KR) ........................ 10-2014-0122134

(51) Int. Cl.
*H05B 33/08*    (2006.01)

(52) U.S. Cl.
CPC ..... *H05B 33/0845* (2013.01); *H05B 33/0815* (2013.01)

(58) Field of Classification Search
CPC ............ H05B 33/0809; H05B 33/0815; H05B 33/0824; H05B 33/083; H05B 33/0845; H05B 33/0884; H05B 33/089; H05B 37/0272
See application file for complete search history.

(56) References Cited

U.S. PATENT DOCUMENTS

| | | | |
|---|---|---|---|
| 2009/0079355 A1* | 3/2009 | Zhou .................. | H05B 33/0818 315/246 |
| 2014/0218657 A1* | 8/2014 | Haruta ................... | G09G 3/342 349/61 |
| 2015/0312984 A1* | 10/2015 | Kim ..................... | H05B 33/083 315/186 |

* cited by examiner

*Primary Examiner* — Seokjin Kim
(74) *Attorney, Agent, or Firm* — Polsinelli LLP

(57) ABSTRACT

A circuit for adjusting a frequency of an AC direct lighting apparatus is provided. The circuit may include a reference voltage generation unit configured to receive a dimming voltage having a first frequency and a first voltage range, and generate a reference voltage having a second voltage range, a sensing section determining unit configured to generate first and second section reference voltages based on the reference voltage, and determine a driving current sensing section using the first and second section reference voltages, and a driving signal generation unit configured to generate a switching device driving signal having a second frequency through the determined driving current sensing section.

13 Claims, 5 Drawing Sheets

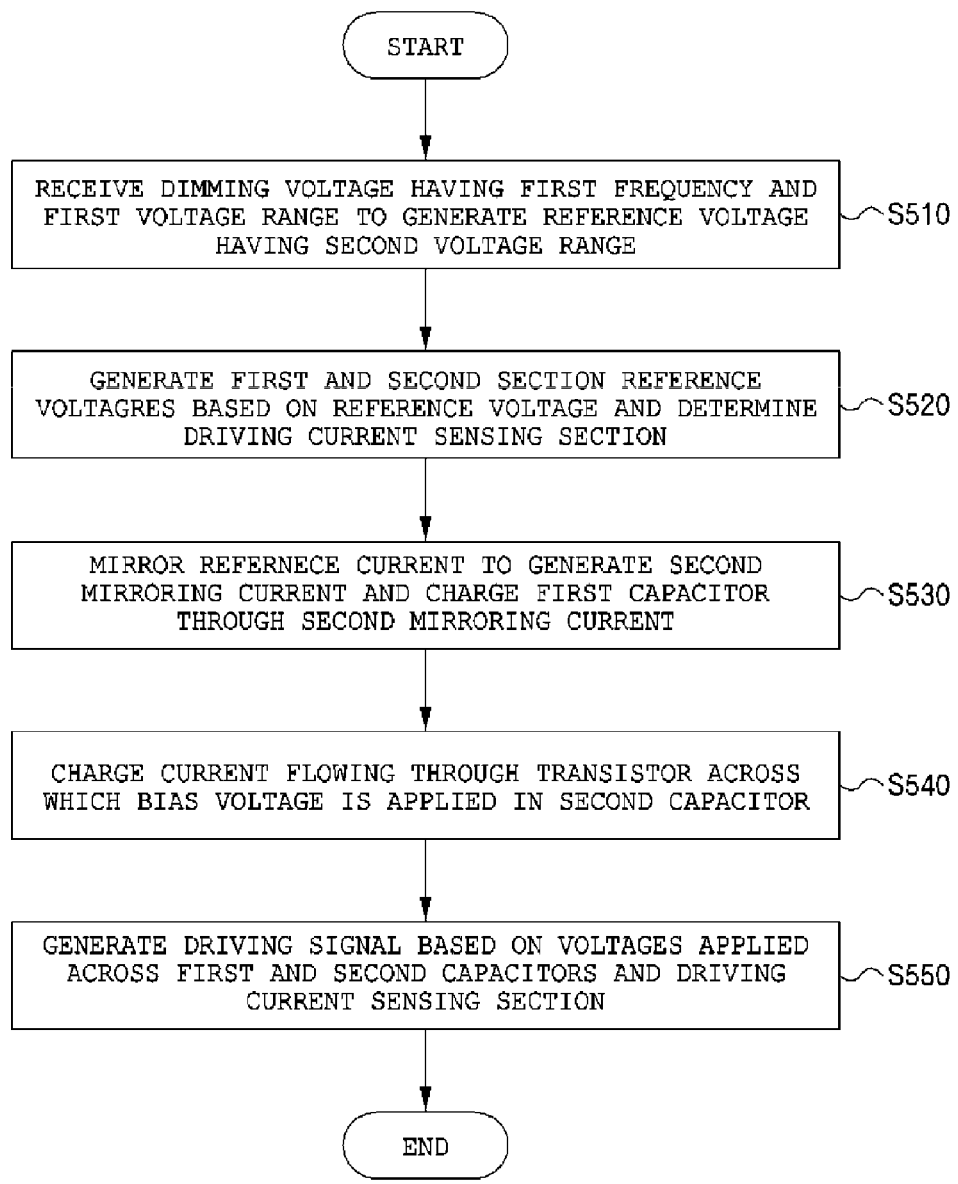

POWER FACTOR CORRECTION CONTROL CIRCUIT AND DRIVING METHOD THEREOF

CROSS-REFERENCE TO RELATED APPLICATIONS

The present application claims priority from Korean Patent Application No. 10-2014-0122134, filed in the Korean Intellectual Property Office on Sep. 15, 2014, the contents of which are hereby incorporated by reference in their entirety.

BACKGROUND

1. Field

The present invention relates to a frequency adjusting technology, and more specifically, to a frequency adjusting circuit and method in an AC direct lighting apparatus, capable of adjusting a frequency of an output current even when an input voltage is changed.

2. Description of the Related Art

Light Emitting Diode (LED) lighting equipment may reduce power consumption compared to other known light sources in the art while still producing a similar amount of illumination. Accordingly, the LED lighting equipment may be used as a substitute or in addition to conventional lighting fixtures. Some LED lighting equipment has adopted the use and implementation of an AC direct driving circuit and are therefore capable of using an AC voltage directly, rather than a DC voltage.

Such an AC direct driving circuit may improve weight and spatial requirements of the LED lighting equipment. However, a frequency of the driving current may change when a reference voltage changes. Further, when sensing a peak value of the driving current in order to adjust the frequency of the driving current, a voltage spike may occur due to a turn-on or turn-off of a switch. Therefore, because of the voltage spike, it may not be possible to sense the driving current precisely.

In the AC direct driving circuit, a frequency fluctuation of the driving current may make it difficult to match timings of an input current and an output current. When a timing of the input current is mismatched with that of the output current, there occurs a reactive power, increasing a power loss of the LED lighting equipment.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a circuit for adjusting a frequency of an AC direct lighting apparatus, including a reference voltage generation unit configured to receive a dimming voltage having a first frequency and a first voltage range, and generate a reference voltage having a second voltage range, a sensing section determining unit configured to generate first and second section reference voltages based on the reference voltage, and determine a driving current sensing section using the first and second section reference voltages, and a driving signal generation unit configured to generate a switching device driving signal having a second frequency through the determined driving current sensing section.

The reference voltage generation unit may be further configured to convert the dimming voltage into a current and mirrors the converted current to generate a first mirroring current.

The reference voltage generation unit may be further configured to convert the first mirroring current into a voltage through a digital-analog converter and generate the reference voltage through an OP amplifier.

The sensing section determining unit may include a section reference voltage generation module configured to distribute the reference voltage by voltage drop across a series of resistors, and generate the first and second section reference voltages based on the resistance ratio between the series of resistors, and a frequency determining module configured to mirror a current having the same magnitude as that of the current flowing to the section reference voltage generation module to induce a second mirroring current, and charge or discharge a first capacitor having a first capacitance through the second mirroring current to determine a second frequency.

The frequency determining module may be further configured to generate a predetermined period using a capacitance ratio of the first and second capacitors through a procedure to charge or discharge a second capacitor having a second capacitance.

The frequency determining module may be further configured to charge the first capacitor during the predetermined period and the second capacitor during the driving current sensing section.

The driving signal generation unit may include an enable signal generation module configured to generate and transmit first to fourth enable signals to control first and second switching devices of the sensing section determining unit in order to charge first and second capacitors and to control third and fourth switching devices of the sensing section determining unit in order to discharge the first and second capacitors, and a driving signal generation module configured to generate the switching device driving signal having a second frequency based on voltages applied across the first and second capacitors and the driving current sensing section.

The driving signal generation unit may sense a driving current at a range of the driving current sensing section and charges the second capacitor to control a voltage spike occurrence.

According to an aspect of another exemplary embodiment, there is provided a method for adjusting a frequency of an AC direct lighting apparatus, including generating a reference voltage having a second voltage range based on receiving a dimming voltage having a first frequency and a first voltage range, generating first and second section reference voltages based on the reference voltage and determining a driving current sensing section based on the first and second section reference voltages, and generating a switching device driving signal having a second frequency through the determined driving current sensing section.

The generating the first and second section reference voltages based on the reference voltage and determining the driving current sensing section based on the first and second section reference voltages may include distributing the reference voltage into a plurality of resistance elements through a reference current to generate first and second section reference voltages, and mirroring the reference current to induce a second mirroring current, and charging or discharging a first capacitor having a first capacitance through the second mirroring current to determine a second frequency.

The generating the switching device driving signal having the second frequency through the determined driving current sensing section may include generating and transmitting first to fourth enable signals to control first and second switching devices in order to charge the first and second capacitors and to control third and fourth switching devices in order to discharge the first and second capacitors, and generating the driving signal having a second frequency based on voltages applied across the first and second capacitors and driving current sensing section.

Other aspects and advantages of the invention will be apparent from the following description and the appended claims.

BRIEF DESCRIPTION OF DRAWINGS

FIG. 5 is a flow chart illustrating a frequency adjusting method of an AC direct lighting apparatus in accordance with an exemplary embodiment of the present disclosure.

Figure 1:
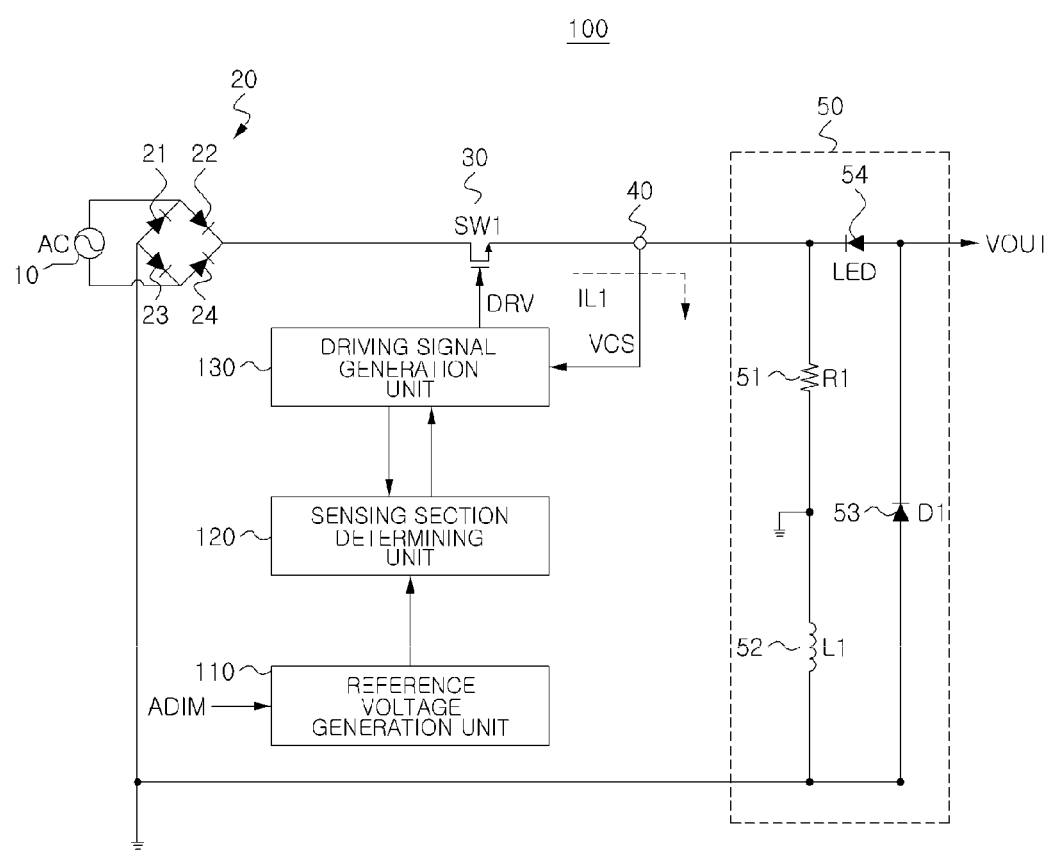
FIG. 1 is a block diagram illustrating a frequency adjusting circuit of an AC direct lighting apparatus in accordance with an exemplary embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

Terms described in the present disclosure may be understood as follows.

Terms such as "first" and "second," etc., may be used to distinguish one component from another. Additionally, it will be understood that when an element is referred to as being "connected to" another element, it can be directly connected to the other element or intervening elements may also be present. In contrast, when an element is referred to as being "directly connected to" another element, no intervening elements are present. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The term " . . . unit" used in the embodiments indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and " . . . units" may be combined into a smaller number of components and " . . . units", or further divided into additional components and " . . . units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

It will be understood that the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

Since the description of an exemplary embodiment of the present invention is merely an exemplary embodiment for structural and functional explanation of the present invention, the scope of a right of the present invention should not be construed to be limited to the exemplary embodiment described in the text of specification but rather only by the claims.

FIG. 1 is a block diagram illustrating a frequency adjusting circuit of an AC direct lighting apparatus in accordance with an exemplary embodiment.

Referring to FIG. 1, a frequency adjusting circuit 100 includes an AC input power supply 10, a diode bridge 20, a reference voltage generation unit 110, a sensing section determining unit 120, a driving signal generation unit 130, a driving switching device 30, a driving current sensing device 40 and a lighting unit 50.

The AC input power supply 10 corresponds to a source of an AC input voltage Vin. A frequency of the AC input voltage Vin may correspond to 50 Hz or 60 Hz depending on power suppliers, which is not limited thereto. Further, the frequency of the AC input voltage Vin may fluctuate depending on current distribution systems.

The diode bridge 20 may be connected to the AC input power supply 10, and may connect a plurality of diodes 21 through 24 to one another. The diode bridge 20 may full-wave rectify the AC input voltage Vin. The full-wave rectified AC input voltage Vin may be provided to the lighting unit 50 through the driving switching device 30.

The reference voltage generation unit 110 may be connected to the sensing section determining unit 120, and receive a dimming voltage ADIM from the outside. The reference voltage generation unit 110 may receive a dimming voltage ADIM having a first frequency and a first voltage range to generate a reference voltage VREFD having a second voltage range. According to an exemplary embodiment, the first frequency may be variable. The reference voltage generation unit 110 may reduce a first voltage range of the dimming voltage ADIM to generate a reference voltage AREFD having a second voltage range.

As a result, the reference voltage generation unit 110 may receive the dimming voltage ADIM from the outside to generate the reference voltage VREFD, and apply the reference voltage VREFD to the sensing section determining unit 120.

The sensing section determining unit 120 may be arranged between the reference voltage generation unit 110 and the driving signal generation unit 130. The sensing section determining unit 120 may receive the reference voltage VREFD from the reference voltage generation unit 110 to generate the first and second section reference voltages. The sensing section determining unit 120 may determine a driving current sensing section through the first and second section reference voltages and apply the first and second section reference voltages to the driving signal generation unit 130.

According to an exemplary embodiment, a voltage spike may occur according to a turn-on or turn-off operation of the driving switching device 30 when sensing a peak current. In order to prevent such a voltage spike, the driving current sensing section may be determined at a predetermined section of the reference voltage VREFD. That is, the sensing section determining unit 120 may generate the first and second section reference voltages based on the reference voltage VREFD to determine the driving current sensing section. Further, the driving signal generation unit 130 may sense the driving current IL1 at the region of the driving current sensing section to prevent an occurrence of the voltage spike.

The driving signal generation unit 130 may be arranged between the sensing section determining unit 120 and the driving switching device 30. The driving signal generation unit 130 may generate a driving signal DRV of the driving switching device 30 having a second frequency through the driving current sensing section. Particularly, the driving signal generation unit 130 may receive a sensing voltage VCS from the driving current sensing device 40 and first and second section reference voltages from the sensing section determining unit 120. The driving signal generation unit 130 may generate an enable signal and a driving signal DRV based on the first and second section reference voltages. The enable signal may be transmitted to the sensing section determining unit 120, and the driving signal DRV may be transmitted to the driving switching device 30.

The driving switching device 30 may be connected between the driving signal generation unit 130 and the lighting unit 50. The driving switching device 30 may receive the driving signal DRV to be turned on or turned off. When the driving switching device 30 is turned on, it enables the driving current IL1 to flow to the inductor 52. When the driving switching device 30 is turned off, it enables the current charged in the inductor 52 to flow to the LED module 54 through the diode 53. According to an exemplary embodiment, the driving switching device 30 may be embodied as a transistor. The driving signal DRV may be transmitted to a gate terminal of the transistor to control a flow of the driving current IL1.

The driving current sensing device 40 may be connected between the driving switching device 30 and the lighting unit 50. The driving current sensing unit 40 may sense the driving current IL1 to apply a sensing voltage VCS to the driving signal generation unit 130.

The lighting unit 50 includes a sensing resistor 51, an inductor 52, a diode 53 and an LED module 54.

According to an exemplary embodiment, when the driving signal DRV corresponds to a positive value (a high level or 1), it may turn on the driving switching device 30. When the driving signal DRV corresponds to a negative value (a low value or 0), it may turn off the driving switching device 30. When the driving switching device 30 is turned on, the driving current IL1 may flow to the sensing resistor 51 and inductor 52, and the energy of the driving current IL1 may be stored in the inductor 52. When the driving switching device 30 is turned off, the energy stored in the inductor 52 may be provided to the LED module 54. In more detail, when the driving switching device 30 is turned off, the inductor 52 may operate as a current source. Based on the energy stored in the inductor 52, the current may flow to the LED module 54 through the diode 53 to drive the LED module 54. The AC direct lighting apparatus may control its output (that is, the driving current IL1) to control the brightness of the LED module 54.

Figure 2:
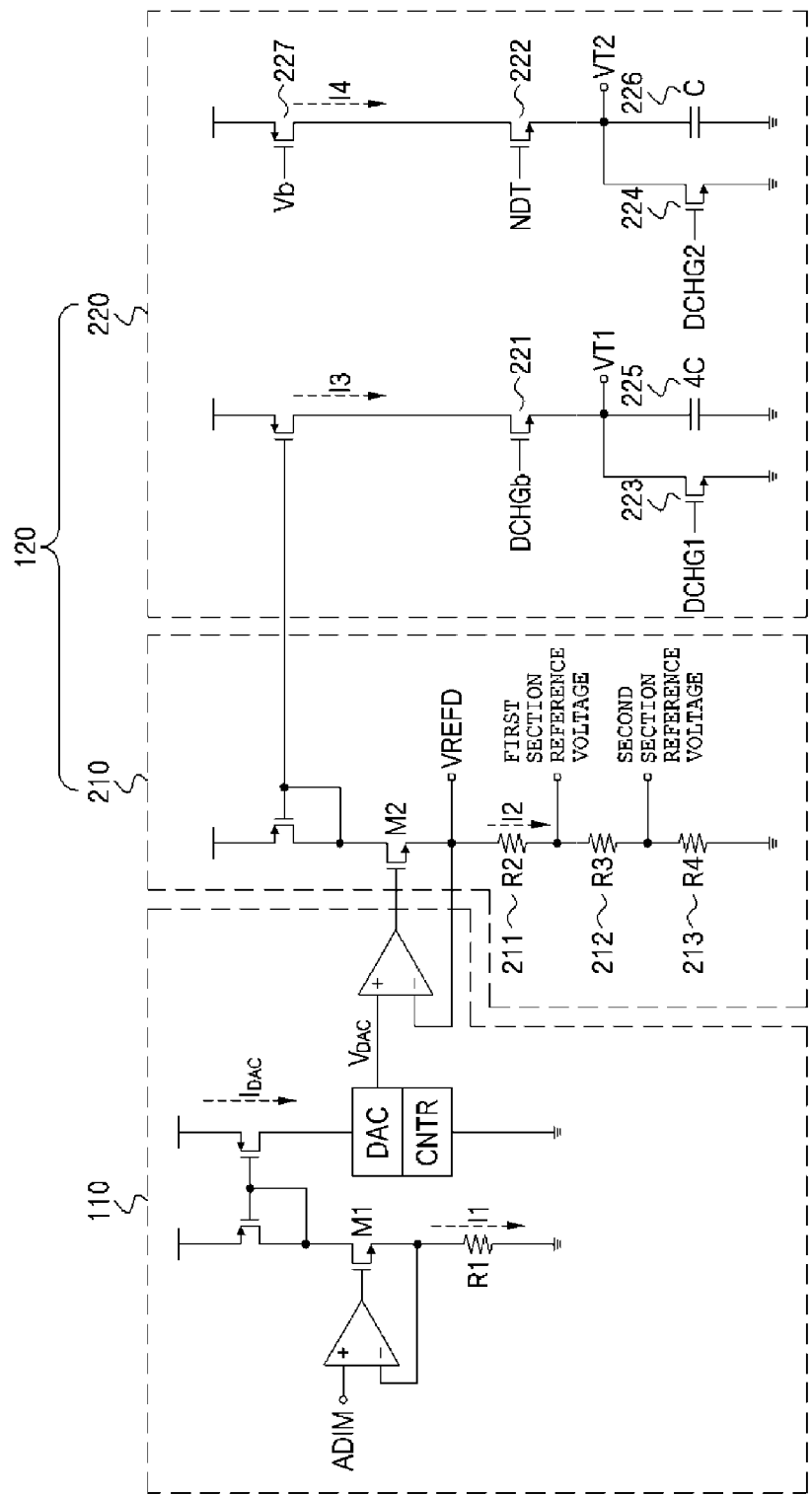
FIG. 2 is a circuit diagram illustrating a construction of a reference voltage generation unit and a sensing section determining unit similar to that shown in FIG. 1, in accordance with an exemplary embodiment of the present disclosure.

FIG. 2 is a circuit diagram illustrating the elements and the arrangement found within a reference voltage generation unit and a sensing section determining unit similar to those found in FIG. 1 in accordance with one or more exemplary embodiments.

The reference voltage generation unit 110 may receive an analog dimming voltage ADIM having a first voltage region from the outside. According to an exemplary embodiment, the reference voltage generation unit 110 may convert the analog dimming voltage ADIM into a current I1 (I1=ADIM/R1), and mirror the converted current I1 to induce a first mirroring current IDAC. The first mirroring current IDAC may be converted into a voltage VDAC through a digital-analog converter DAC (VDAC=IDAC*RDAC, *RDAC the RDAC corresponds to an internal resistance of the digital-analog converter), and generate a reference voltage VREFD having a second voltage region through an OP amplifier (OP-AMP) (VDAC=VREFD).

Referring to FIG. 2, the sensing section determining unit 120 includes a section reference voltage generation module 210 and a frequency determining module 220.

The section reference voltage generation module 210 may be arranged between the reference voltage generation unit 110 and the frequency determining module 220. The section reference voltage generation module 210 may distribute the reference voltage VREFD by voltage drop to generate first and second section reference voltages. According to an exemplary embodiment, when the reference voltage VREFD is applied across both ends of a plurality of resistance elements RT (211 to 213), a reference current I2 may be generated (I2=VREFD/RT, RT=R2+R3+R4).

The reference voltage VREFD may drop when the reference current I2 flows through a plurality of resistance elements RT (211 to 213). The first and second section reference voltages may be determined by a resistance ratio of the plurality of resistance elements RT (211 to 213). For example, when a ratio of the plurality of resistance elements (211 to 213) is 2:5:3, the first section reference voltage may correspond to 0.8 VREFD, and the second section reference voltage may correspond to 0.3 VREFD. Accordingly, the first and second section reference voltages may be determined by making the ratio of the plurality of resistance elements (211 to 213) different.

The frequency determining module 220 may be connected to the section reference voltage generation module 210 and the driving signal generation unit 130. The frequency determining module 220 may mirror the same current as the reference current I2 in magnitude to induce a second mirroring current I3 (I2=I3=(ADIM*RDAC)/(R1*RT)). The frequency determining module 220 may charge a second mirroring current I3 flowing through a first switching device 221 in a first capacitor 225 having a first capacitance. In more detail, when the first switching device 221 is turned on and the third switching device 223 is turned off, the second mirroring current I3 may be charged in the first capacitor 225. However, when the first switching device 221 is turned off and the third switching device 223 is turned on, the first capacitor 225 may be discharged so that the energy stored in the first capacitor 225 may be discharged.

The frequency determining module 220 may charge the current I4 flowing through a transistor 227 across which a bias voltage Vb is applied in a second capacitor 226 having a second capacitance. In more detail, when the second switching device 222 is turned on and a fourth switching device 224 is turned off, the current I4 may be charged in the second capacitor 226. However, when the second switching device 222 is turned off and the fourth switching device 224 is turned on, the second capacitor 226 may be discharged so that the energy stored in the second capacitor 226 may be emitted. According to an exemplary embodiment, the first to fourth switching devices 221 to 224 may be embodied as transistors.

The frequency determining module 220 may generate a predetermined period using a capacitance ratio of the first and second capacitors 225 and 226. According to an exemplary embodiment, it is assumed that the capacitance ratio of the first and second capacitors 225 and 226 is 4:1. In this case, the voltage VT1 applied across the first capacitor 225 may correspond to "VT1=(I3*4T)/4C=(ADIM*RDAC*4T)/(R1*RT*4C)". As a result, the voltage VT1 applied across the first capacitor 225 may be changed depending on the dimming voltage ADIM, and the frequency determining module 220 may accordingly change the magnitude of the current I3 charged in the capacitor 225 to have a predetermined period "T=(C*V)/I". Further, the voltage VT2 applied across the second capacitor 226 may correspond to "VT2=(I4*T)/C". In the expression of "VT2=(I4*T)/C", since the capacitance of the second capacitor 226 and the magnitude of the current I4 are constant, when the voltage VT1 changes as the dimming voltage VDIM changes, the period T at which the second capacitor 226 is charged may change according to the expression of "VT1=VT2" so that it may be possible to sense the driving current IL1 during a predetermined section.

Figure 3:
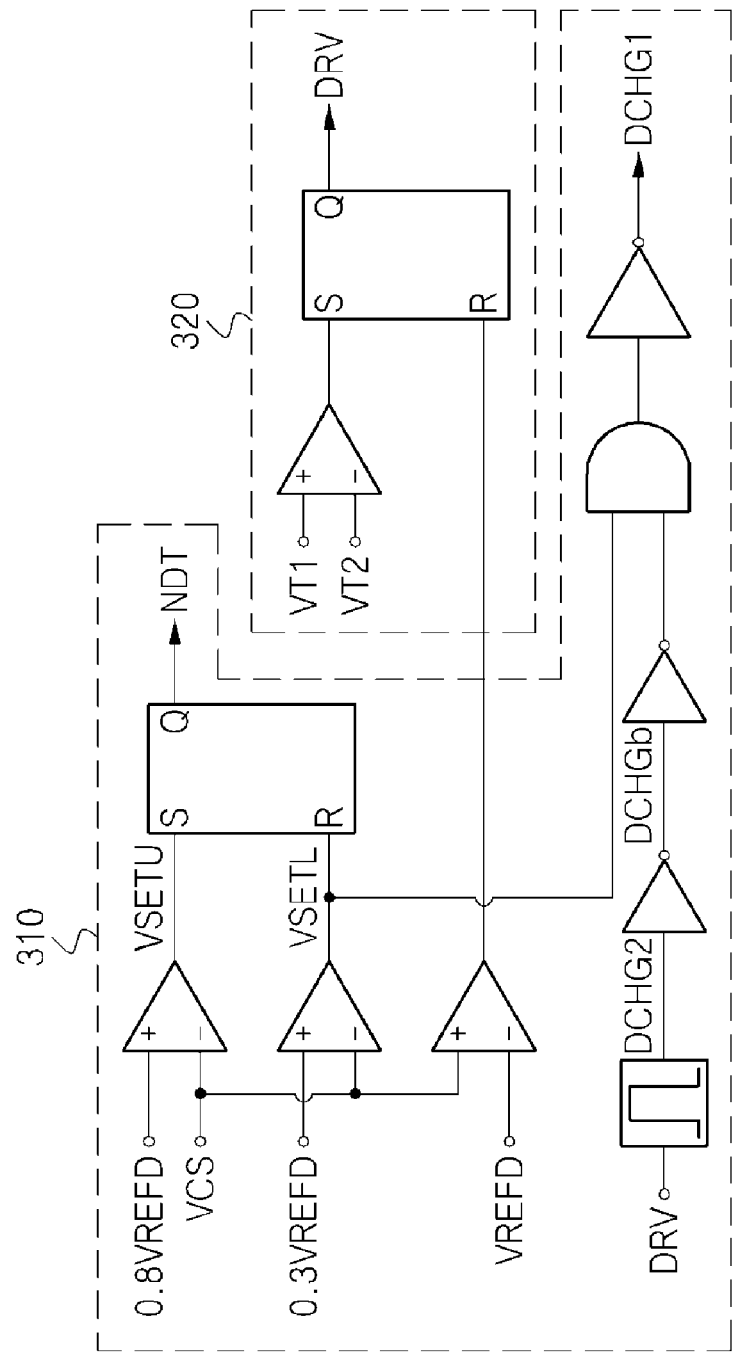
FIG. 3 is a circuit diagram illustrating a construction of a driving signal generation unit similar to that shown in FIG. 1, in accordance with an exemplary embodiment of the present disclosure.
Figure 4:
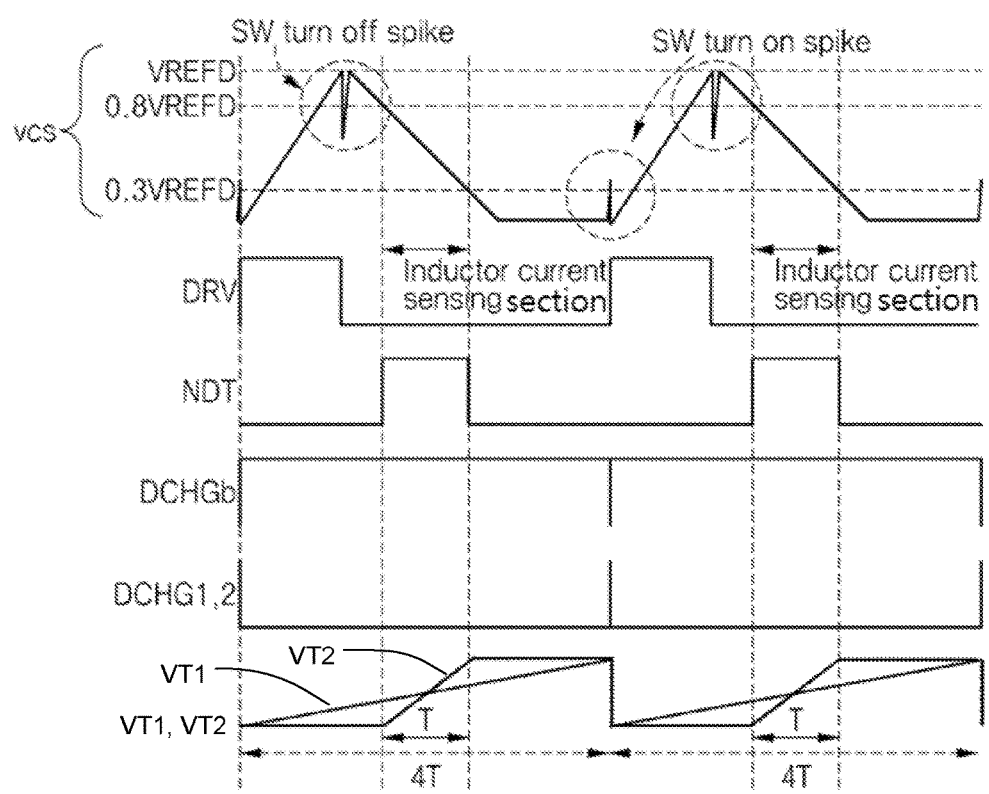
FIG. 4 is a timing diagram illustrating operations of a sensing section determining unit and a driving signal generation unit similar to that shown in FIG. 1, in accordance with an exemplary embodiment of the present disclosure.

FIG. 3 is a circuit diagram illustrating elements and their placement of a driving signal generation unit 130 similar to that shown in FIG. 1. FIG. 4 is a timing diagram illustrating operations of a sensing section determining unit 120 and a driving signal generation unit 130 similar to those shown in FIG. 1.

Referring to FIG. 3, the driving signal generation unit 130 includes an enable signal generation module 310 and a driving signal generation module 320.

The enable signal generation module 310 may generate first to fourth enable signals (DCHGb, NDT, DCHG1 and DCHG2) to control first and second switching devices 221 and 222 in order to charge the first and second capacitors 225 and 226, and to control third and fourth switching devices 223 and 224 in order to discharge the first and second capacitors 225 and 226. According to an exemplary embodiment, the enable signal generation module 310 may generate the first to fourth enable signals (DCHGb, NDT, DCHG1 and DCHG2) to control the first to fourth switching devices 221 to 224, respectively. When the first to fourth enable signals (DCHGb, NDT, DCHG1 and DCHG2) correspond to a positive value (a high level or 1), they may turn on the first to fourth switching devices 221 to 224 of the sensing section determining unit 120. Further, when the first to fourth enable signals (DCHGb, NDT, DCHG1 and DCHG2) correspond to a negative value (a low level or 0), they may turn off the first to fourth switching devices 221 to 224.

The driving signal generation module 320 may control the driving switching device 30 to generate the driving signal DRV having a second frequency. In more detail, the driving signal generation module 320 may receive voltages VT1 and VT2 applied across the first and second capacitors 225 and 226 and a reset signal RST output from the enable signal generation module 310. According to an exemplary embodiment, the driving signal generation module 320 may provide an SR latch with OP amplifier outputs of the received voltages VT1 and VT2 and a reset signal RST, and generate a driving signal DRV through the SR latch.

According to an exemplary embodiment, the frequency determining module 220 may charge the first capacitor 225 during a predetermined period and the second capacitor 226 during the driving current sensing section. When the first switching device 221 is turned on and the third switching device 223 is turned off, the first capacitor 225 may be charged during a predetermined period 4T. Further, when the second switching device 222 is turned on and the fourth switching device 224 is turned off, the second capacitor 226 may be charged during a driving current sensing section T. For example, when the capacitance of the first capacitor 225 is a value of "4C", the voltage VT1 applied across the first capacitor 225 may be charged through the second mirroring current I3 during the period of "4T". Further, when the capacitance of the second capacitor 226 is a value of "C", the voltage VT2 applied across the second capacitor 226 may be charged during the period of "T". As a result, the frequency adjusting circuit 100 may have a predetermined period using a capacitance ratio of the first and second capacitors 225 and 226, and fix a frequency of the driving current IL1 (that is, a second frequency of the driving current DRV).

FIG. 5 is a flow chart illustrating a frequency adjusting method of an AC direct lighting apparatus in accordance with an exemplary embodiment of the present invention.

The reference voltage generation unit 110 may receive the dimming voltage ADIM having a first frequency and a first voltage range to generate the reference voltage VREFD having a second voltage range (step S510).

The section reference voltage generation module 210 may generate first and second section reference voltages based on the reference voltage VREFD to determine a driving current sensing section (step S520).

The frequency determining module 220 may mirror a reference current I2 to generate a second mirroring current I3 and charge a first capacitor 225 through a second mirroring current I3 (step S530).

The frequency determining module 220 may charge a current I4 flowing through a transistor 227 across which a bias voltage Vb is applied in a second capacitor 226 (step S540).

The driving signal generation unit 130 may generate a driving signal DRV based on voltages VT1 and VT2 applied across the first and second capacitors 225 and 226 and a driving current sensing section (step S550).

Although preferred embodiments of the present disclosure were described above, it would be understood by those skilled in the art that the present invention can be modified or changed in various ways without departing from the technical principles and scope defined by the appended claims.

DESCRIPTION OF SYMBOLS

10: AC input power supply
20: Diode bridge
30: Driving switching device
40: Driving current sensing device
50: Lighting unit
51: Sensing resistor
52: Inductor
53: Diode
54: LED (Light Emitting Diode) module
100: Frequency adjusting circuit of AC direct lighting apparatus
110: Reference voltage generation unit
120: Sensing section determining unit
130: Driving signal generation unit
210: Section reference voltage generation module
211, 212, 213: Plurality of resistance elements
220: Frequency determining module
221: First switching device
222: Second switching device
223: Third switching device
224: Fourth switching device
225: First capacitor
226: Second capacitor
227: Transistor
310: Enable signal generation module
320: Driving signal generation module Further, one or more exemplary embodiment of the present invention may try to fix a frequency of a driving current by making the driving current have a predetermined period regardless of a change of a reference voltage. Another exemplary embodiment of the present invention may try to prevent a voltage spike caused by a turn-on or turn-off of a switch when sensing a driving current.

In some embodiments, a circuit for adjusting a frequency of an AC direct lighting apparatus includes a reference voltage generation unit configured to receive a dimming voltage having a first frequency and a first voltage range to generate a reference voltage having a second voltage range, a sensing section determining unit configured to generate first and second section reference voltages based on the reference voltage to determine a driving current sensing section, and a driving signal generation unit configured to generate a switching device driving signal having a second frequency through the determined driving current sensing section.

In another embodiment, the reference voltage generation unit may convert the dimming voltage into a current and mirror the converted current to generate a first mirroring current. In another embodiment, the reference voltage generation unit may convert the first mirroring current into a voltage through a digital-analog converter and generate a reference voltage through an OP amplifier.

In another embodiment, the sensing section determining unit may include a section reference voltage generation module configured to distribute the reference voltage by voltage drop to generate the first and second section reference voltages, and a frequency determining module configured to mirror a current having the same magnitude as that of the current flowing to the section reference voltage generation module to induce a second mirroring current, and charge or discharge a first capacitor having a first capacitance through the second mirroring current to determine a second frequency.

In another embodiment, the frequency determining module may generate a predetermined period using a capacitance ratio of the first and second capacitors through a procedure to charge or discharge a second capacitor having a second capacitance. In another embodiment, the frequency determining module may charge the first capacitor during the predetermined period and the second capacitor during the driving current sensing section.

In one embodiment, the driving signal generation unit may include an enable signal generation module configured to generate and transmit first to fourth enable signals to control first and second switching devices in order to charge the first and second capacitors and to control third and fourth switching devices in order to discharge the first and second capacitors; and a driving signal generation module configured to generate the driving signal having a second frequency based on voltages applied across the first and second capacitors and the driving current sensing section.

In one embodiment, the driving signal generation unit may sense a driving current at a range of the driving current sensing section and charge the second capacitor to control a voltage spike occurrence. In some embodiments, a method for adjusting a frequency of an AC direct lighting apparatus includes (a) receiving a dimming voltage having a first frequency and a first voltage range to generate a reference voltage having a second voltage range; (b) generating first and second section reference voltages based on the reference voltage to determine a driving current sensing section; and (c) generating a switching device driving signal having a second frequency through the determined driving current sensing section.

In one embodiment, the step (b) may include (b-1) distributing the reference voltage into a plurality of resistance elements through a reference current to generate first and second section reference voltages; and (b-2) mirroring the reference current to induce a second mirroring current, and charging or discharging a first capacitor having a first capacitance through the second mirroring current to determine a second frequency.

In one embodiment, the step (c) may include (c-1) generating and transmitting first to fourth enable signals to control first and second switching devices in order to charge the first and second capacitors and to control third and fourth switching devices in order to discharge the first and second capacitors; and (c-2) generating the driving signal having a second frequency based on voltages applied across the first and second capacitors and driving current sensing section.

The disclosed technology and one or more exemplary embodiments may provide different effects. However, it does not mean that a specific embodiment should include all of following effects or only the following effects. Technical scopes of the disclosed technology should not be appreciated to be limited thereto.

Particularly, in a frequency adjusting circuit and method of an AC direct lighting apparatus in accordance with an exemplary embodiment of the present invention, it may be possible to fix a frequency of a driving current by making the driving current have a predetermined period regardless of a change of a reference voltage.

Further, in a frequency adjusting circuit and method of an AC direct lighting apparatus in accordance with an exemplary embodiment of the present invention, it may be possible to prevent a voltage spark caused by a switch turn-on or turn-off when sensing a driving current.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A circuit for adjusting a frequency of an AC (Alternating Current) direct lighting apparatus, comprising:
    a reference voltage generation unit that receives a dimming voltage having a first frequency and a first voltage range, and generates a reference voltage having a second voltage range;
    a sensing section determining unit that generates first and second section reference voltages based on the reference voltage, and determines a driving current sensing section based on the first and second section reference voltages; and
    a driving signal generation unit that generates a switching device driving signal having a second frequency during the driving current sensing section, wherein the second frequency is determined based on a duration of the driving current sensing section, and wherein the second frequency has a fixed switching frequency regardless of a change of the reference voltage.

2. The circuit of claim 1, wherein the reference voltage generation unit converts the dimming voltage into a current and mirrors the converted current to generate a first mirroring current.

3. The circuit of claim 2, wherein the reference voltage generation unit converts the first mirroring current into a voltage through a digital-analog converter and generates the reference voltage through an OP (Operational) amplifier.

4. A circuit for adjusting a frequency of an AC (Alternating Current) direct lighting apparatus, comprising:
    a reference voltage generation unit that receives a dimming voltage having a first frequency and a first voltage range, and generates a reference voltage having a second voltage range;
    a sensing section determining unit that generates first and second section reference voltages based on the reference voltage, and determines a driving current sensing section based on the first and second section reference voltages; and
    a driving signal generation unit that generates a switching device driving signal having a second frequency during the driving current sensing section,
    wherein the sensing section determining unit comprises:
        a section reference voltage generation module that distributes the reference voltage by voltage drop across a series of resistors, and generates the first and second section reference voltages based on a resistance ratio between the series of resistors; and
        a frequency determining module that mirrors a current having the same magnitude as that of the current flowing to the section reference voltage generation module to induce a second mirroring current, and charges or discharges a first capacitor having a first capacitance through the second mirroring current to determine a second frequency.

5. The circuit of claim 4, wherein the frequency determining module generates a predetermined period based on a capacitance ratio of the first capacitor and a second capacitor through a procedure to charge or discharge the second capacitor having a second capacitance.

6. The circuit of claim 5, wherein the frequency determining module charges the first capacitor during the predetermined period and charges the second capacitor during the driving current sensing section.

7. The circuit of claim 1, wherein the driving signal generation unit comprises:
    an enable signal generation module that generates and transmits first to fourth enable signals to control first and second switching devices of the sensing section determining unit in order to charge first and second capacitors and to control third and fourth switching devices of the sensing section determining unit in order to discharge the first and second capacitors; and
    a driving signal generation module that generates the switching device driving signal having a second frequency based on voltages applied across the first and second capacitors and the driving current sensing section.

8. The circuit of claim 7, wherein the driving signal generation unit senses a driving current on a range of the driving current sensing section and charges the second capacitor to control a voltage spike occurrence.

9. A method for adjusting a frequency of an AC (Alternating Current) direct lighting apparatus, comprising:
　receiving a dimming voltage having a first frequency and a first voltage range;
　generating a reference voltage having a second voltage range based on the dimming voltage;
　generating first and second section reference voltages based on the reference voltage;
　determining a driving current sensing section based on the first and second section reference voltages; and
　generating a switching device driving signal having a second frequency during the driving current sensing section, wherein the second frequency is determined based on a duration of the driving current sensing section, and wherein the generating the switching device driving signal comprises:
　　generating and transmitting first to fourth enable signals to control first and second switching devices in order to charge first and second capacitors and to control third and fourth switching devices in order to discharge the first and second capacitors; and
　　generating the driving signal having the second frequency based on voltages applied across the first and second capacitors and the driving current sensing section.

10. The method of claim 9, wherein the generating the first and second section reference voltages comprises distributing the reference voltage into a plurality of resistance elements through a reference current to generate first and second section reference voltages.

11. A method for adjusting a frequency of an AC (Alternating Current) direct lighting apparatus, comprising:
　receiving a dimming voltage having a first frequency and a first voltage range;
　generating a reference voltage having a second voltage rang based on the dimming voltage;
　generating first and second section reference voltages based on the reference voltage, wherein the generating the first and second section reference voltages comprises distributing the reference voltage into a plurality of resistance elements through a reference current to generate first and second section reference voltages;
　determining a driving current sensing section based on the first and second section reference voltages, wherein the determining the driving current sensing section comprises:
　　mirroring the reference current to induce a second mirroring current; and
　　charging or discharging a first capacitor having a first capacitance through the second mirroring current to determine the second frequency; and
　generating a switching device driving signal having a second frequency during the driving current sensing section, wherein the second frequency is determined based on a duration of the driving current sensing section.

12. The circuit of claim 4, rein the second frequency is determined based on a duration of the driving current sensing section.

13. The method of claim 11, wherein the generating the switching device driving signal comprises:
　generating and transmitting first to fourth enable signals to control first and second switching devices in order to charge the first capacitor and a second capacitor and to control third and fourth switching devices in order to discharge the first and second capacitors; and
　generating the driving signal having the second frequency based on voltages applied across the first and second capacitors and the driving current sensing section.

* * * * *